Feb. 26, 1946.　　　F. N. G. KRANICK ET AL　　　2,395,672
HARVESTING MACHINE
Filed April 14, 1942　　　7 Sheets-Sheet 2
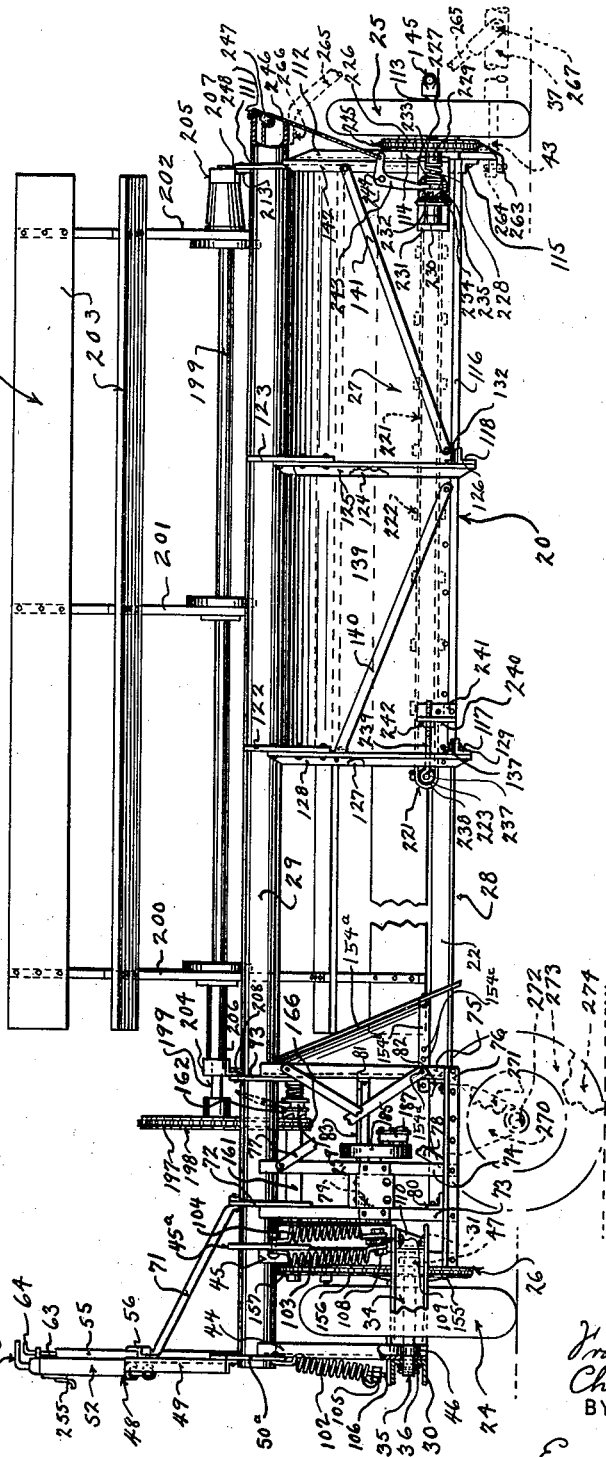
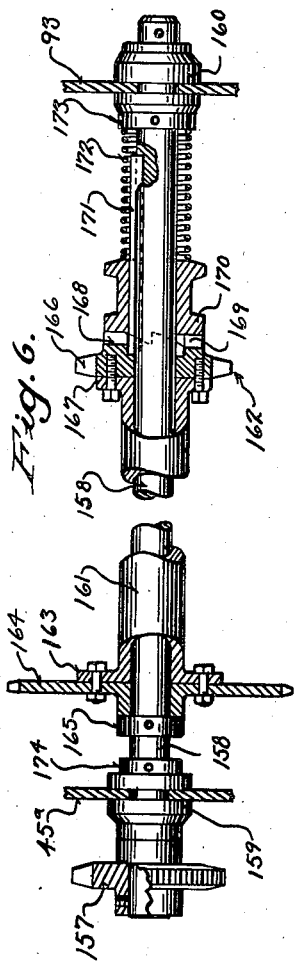
INVENTORS
Frank N. G. Kranick
Charles Wm Hansen
BY
Emerson B Donnell
ATTORNEY Feb. 26, 1946.   F. N. G. KRANICK ET AL   2,395,672
HARVESTING MACHINE
Filed April 14, 1942   7 Sheets-Sheet 3
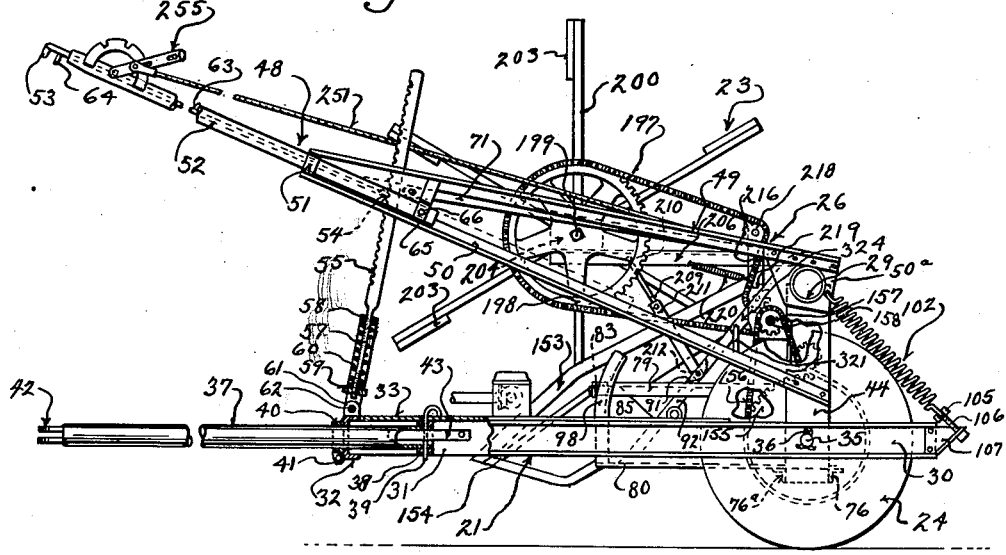
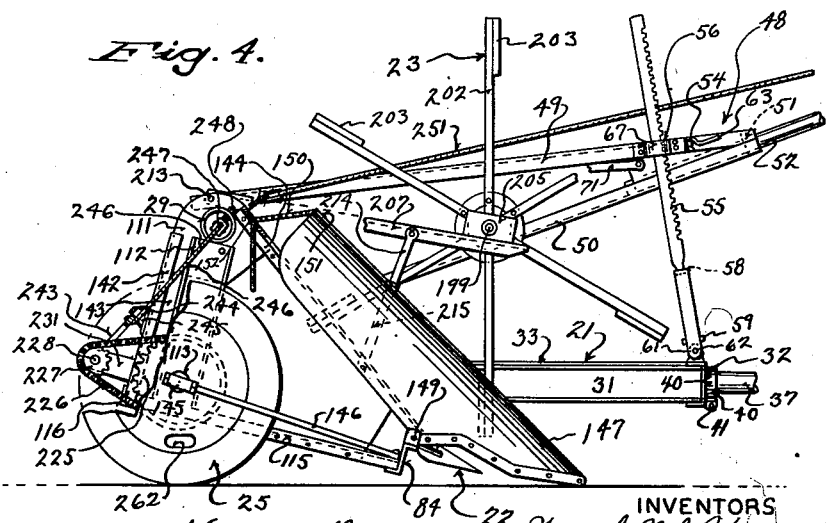
INVENTORS
Frank N. G. Kranick
Charles Wm. Hansen
BY
Emerson B. Donnell
ATTORNEY

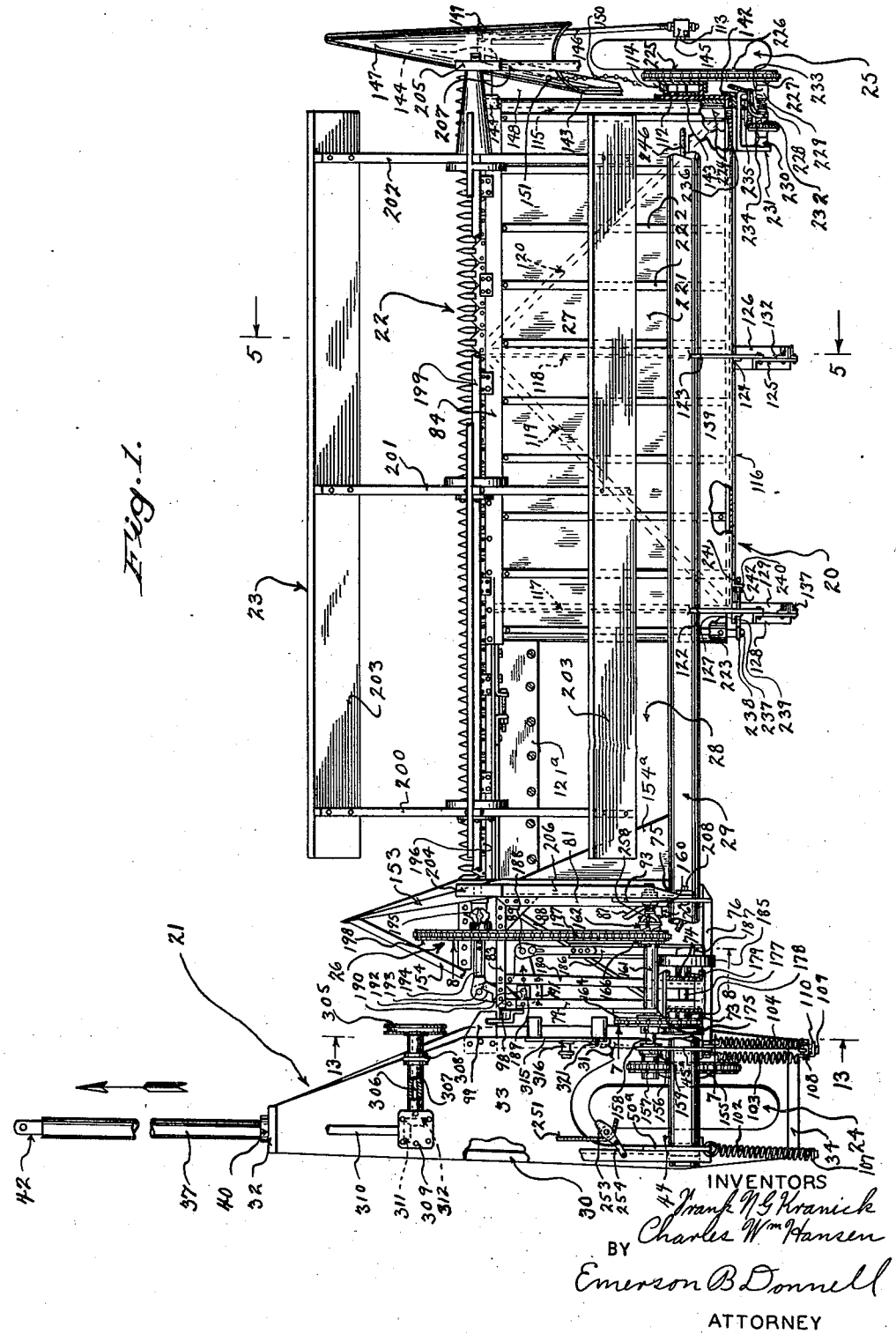

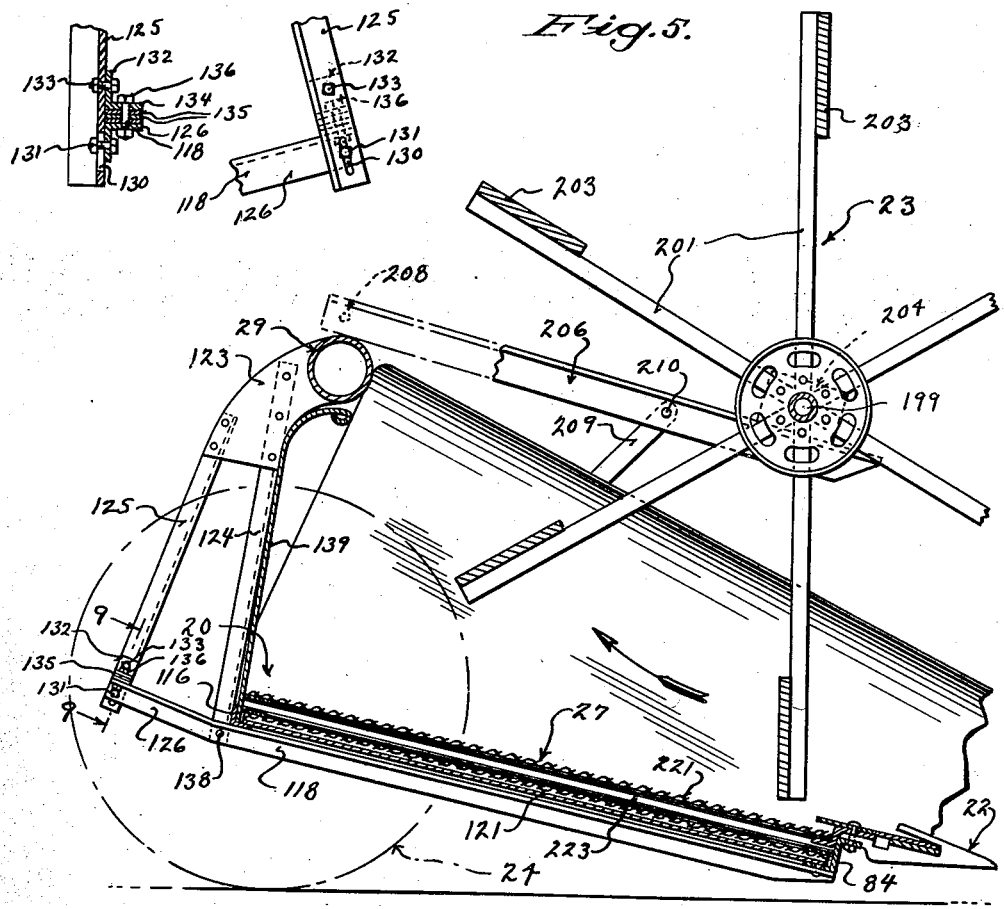

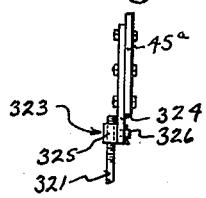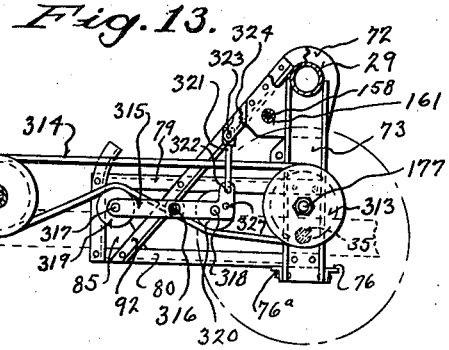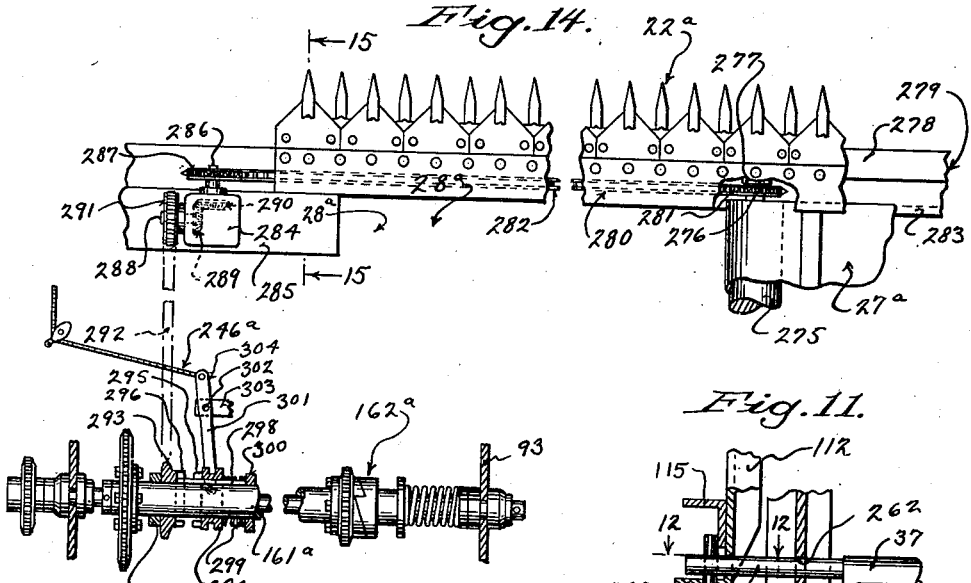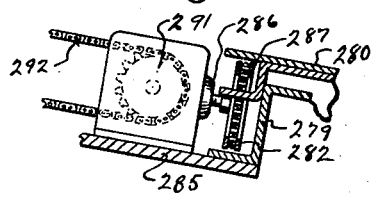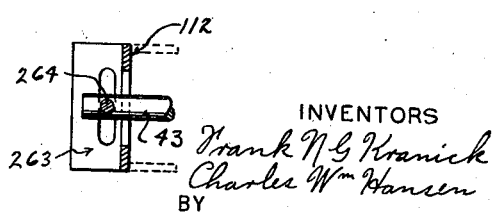

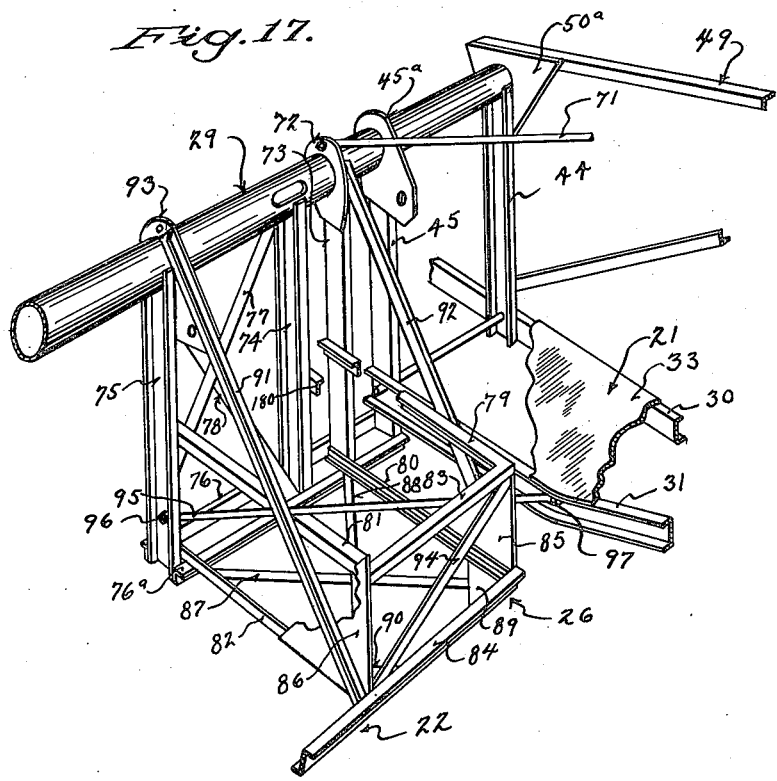
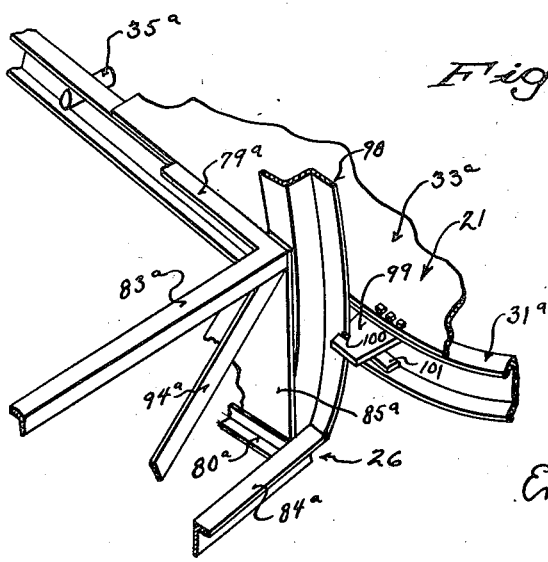

Feb. 26, 1946.　　F. N. G. KRANICK ET AL　　2,395,672
HARVESTING MACHINE
Filed April 14, 1942　　7 Sheets-Sheet 7
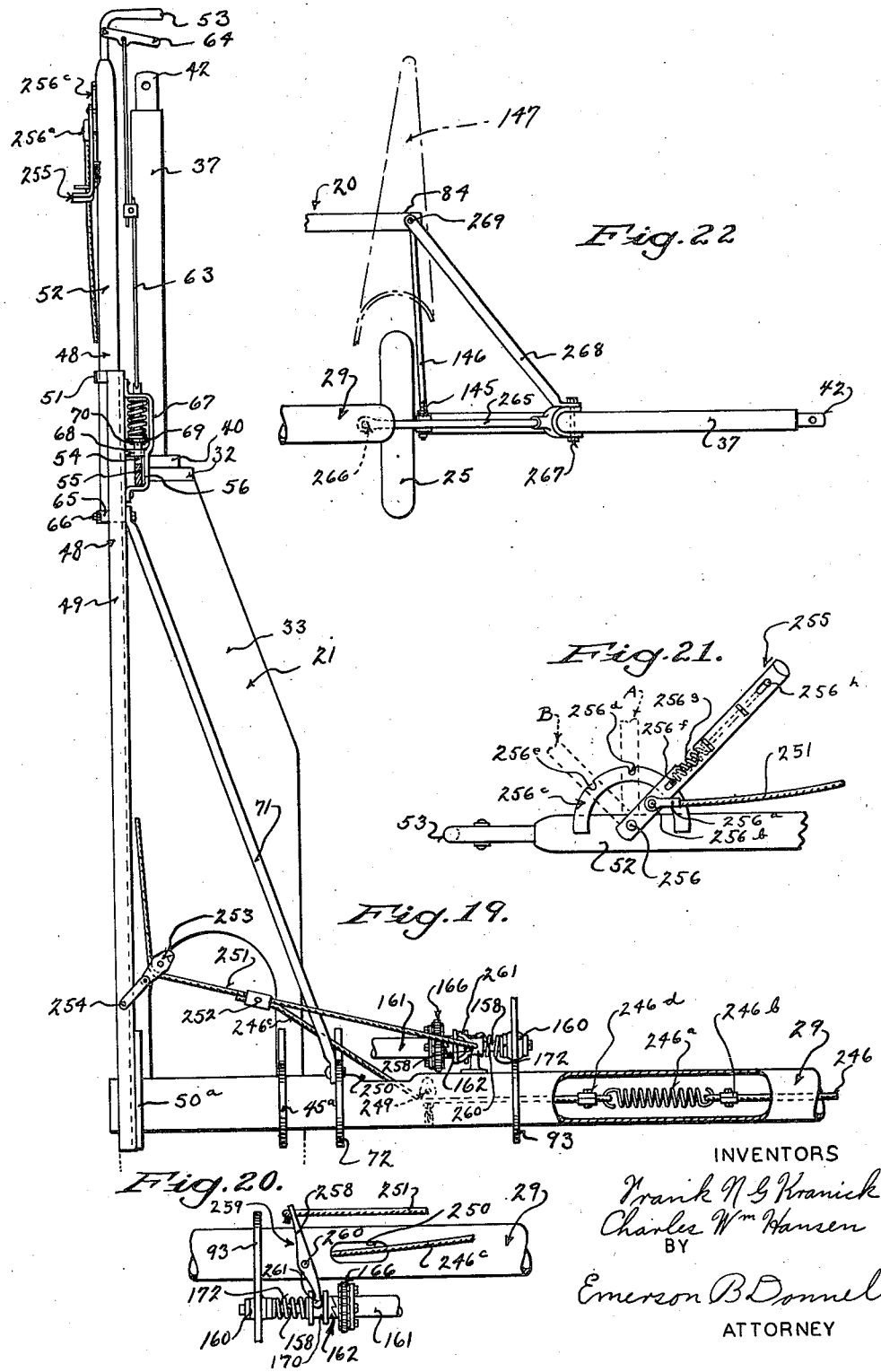
INVENTORS
Frank N. G. Kranick
Charles Wm Hansen
BY
Emerson B. Donnell
ATTORNEY Patented Feb. 26, 1946

2,395,672

UNITED STATES PATENT OFFICE 2,395,672

HARVESTING MACHINE

Frank N. G. Kranick and Charles Wm. Hansen, Racine, Wis., assignors to J. I. Case Company, Racine, Wis., a corporation Application April 14, 1942, Serial No. 438,958

12 Claims. (Cl. 56—23)

The present invention relates to harvesting machines and more particularly to such as deposit the harvested crop on the ground in the form of a windrow and an object of the invention is to generally improve the construction and operation of machines of this class. More particularly, an object of the invention is to provide an improved frame and general setup for such a machine adapted to give the machine great strength and stability, to facilitate adjustments for different heights of cutting, to facilitate the installation of the driving machinery and to provide for ready transportation.

Further objects are to provide improved driving means for an apron and which will automatically interrupt the apron drive when turns are made.

A further object is to provide a supervisory manual control for the apron such that it can be controlled at any time independently of the automatic stopping feature.

A further object is to provide a manual control for all of the operative mechanism so that the machine may be trailed without operating the harvesting mechanism.

A further object is to provide a modified apron drive which avoids any obstruction whatever of the windrow being formed behind the machine.

A further object is to provide a drive which may be readily converted from ground to power take-off drive according to the condition of a crop being harvested or for other reasons.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

In the annexed drawings,

Figure 1 is a plan view of the illustrative machine with parts broken away.

Fig. 2 is a rear elevation of the same.

Fig. 3 is a left side elevation of the machine with parts in section.

Fig. 4 is a right side elevation with parts in section and others removed.

Fig. 5 is a sectional view of the machine taken on the line 5—5 of Fig. 1.

Fig. 6 is a detail partly in section of certain mechanism indicated in Figs. 1, 2 and 3.

Fig. 7 is a vertical sectional view taken on the line 7—7 of Fig. 1.

Fig. 8 is a vertical sectional view on the line 8—8 of Fig. 1.

Fig. 9 is a sectional view taken on the line 9—9 of Fig. 5.

Fig. 10 is an enlarged left side elevation of certain structure indicated in Fig. 5.

Fig. 11 is an enlarged vertical sectional view of certain mechanism indicated in Fig. 2.

Fig. 12 is a horizontal sectional view taken on the line 12—12 of Fig. 11.

Fig. 13 is a vertical sectional view taken on the line 13—13 of Fig. 1, showing a power take-off drive.

Fig. 14 is an enlarged plan view of certain mechanism indicated in Fig. 1 with parts removed and others broken away and showing a modified arrangement.

Fig. 15 is a sectional view taken on the line 15—15 of Fig. 14.

Fig. 16 is an enlarged detail, partly broken away, of certain mechanism indicated in Fig. 4.

Fig. 17 is a perspective view, with parts broken away and others removed, of the framing in the region of the connection between the drawbar and the rest of the machine.

Fig. 18 is a similar view of a fragment of Fig. 17 enlarged, showing a modified construction.

Fig. 19 is an enlarged plan view of certain mechanism indicated in Figs. 2, 3 and 4.

Fig. 20 is a front elevation of a portion of Fig. 19.

Fig. 21 is a left side elevation of a portion of Fig. 19.

Fig. 22 is a plan view of a portion of Fig. 1, showing an arrangement adapted for transportation.

Fig. 23 is a detail of certain mechanism shown in Fig. 13.

It is to be understood that this description is directed to a preferred embodiment, but that changes are contemplated; that where chains and sprockets are mentioned specifically, belts and pulleys might be substituted within the scope of the invention; that the showing of bolts, rivets, etc., has been omitted in most instances, to avoid unduly complicating the drawings and description, it being understood that where two parts are described as fastened together, or fixed with each other, suitable fastening means is used within the knowledge of one skilled in the art.

As seen in Fig. 1, the illustrative machine comprises a platform generally designated as 20 and a draw bar generally designated as 21, platform 20 having a cutter bar generally designated as 22. A reel generally designated as 23 is supported generally above cutter bar 22 in well-known manner. The structure is carried on a ground wheel 24 approximately at the juncture of platform 20 and draw bar 21 and a ground wheel 25 at the outer or grain end of platform 20. Certain elements of the machine are actuated from ground wheel 24 through mechanism generally designated as 26. Platform 20 has an apron, draper or conveyor 27 which is driven in the present instance from supporting wheel 25 as will appear, and the apron terminates of actuating mechanism 26 to leave a gap or opening 28 through which harvested material is placed on the ground in the form of a windrow.

In machines of this general type, a common source of weakness lies in the opening 28 and in the present instance a tubular frame member or pipe 29 of great strength is provided to bridge this opening and cooperate with draw bar 21, the latter being connected to pipe 29 and platform 20, and the other component parts of the machine all being supported from tubular member 29. The connection from draw bar 21 to tubular member 29 is an important phase of the invention, since obviously it is desirable that tubular member 29 be elevated substantially above platform 20 for free escape of the windrow beneath member 29, while it is also necessary that cutter bar 22 be arranged to be readily raised and lowered to suit various heights of crops to be harvested from time to time. In addition, there is a decided backward reaction against the outer portion of cutter bar 22 causing a concentration of stresses in the neighborhood of mechanism 26 tending to separate this portion of the machine from draw bar 21. This tendency is resisted and the other stressses in the machine are resisted in the present instance by utilizing tubular member 29 and draw bar 21 as the elements of a truss and by the utilization of other cooperating members as will now be described.

Tubular member 29 has excellent torsional strength and strength to rest bending while cutter bar 22 also has substantial strength as a compression or tension member. In general, therefore, cutter bar 22 and tubular member 29 are used respectively as tension and compression members in a truss to resist the backward bending tendency of the machine as a whole relative to draw bar 21. This will be apparent from Fig. 1. In addition, tubular member 29, as better suggested in Fig. 2, together with certain interposed parts acts as a bridge between wheels 24 and 25 to support the several component parts of the machine. By virtue of the upward spacing of tubular member 29 above cutter bar 22 and ground wheels 24 and 25, the forward pull on member 29 and the backward resistance on cutter bar 22 and wheel 25 sets up a couple tending to produce clockwise rotation of platform 20 about tubular member 29 as apparent from Fig. 4. This would be difficult to resist by any arrangement of spaced truss elements without encumbering the operative features of the machine, but since tubular member 29 is torsionally resistant in itself, this rotation or twisting tendency can be effectively resisted by tubular member 29 alone.

To this end, the truss constituted by cutter bar 22 and member 29 is anchored to draw bar 21, as will appear, to resist separation from backward bending, while tubular member 29 is anchored to draw bar 21 in desired rotated position. Due to the inherent torsional resistance of member 29, platform 20 will then remain in fixed relation to the position of member 29 in spite of the rotative couple above outlined.

Returning to a description of the detailed construction of the present illustrative embodiment, draw bar 21 comprises forwardly extending members 30 and 31, member 31 approaching member 30 and being united therewith by a cross piece 32. A plate 33 closes the space between members 30 and 31 and forms a deck, tying the whole together and forming a very strong rigid assembly. Plate 33 is cut away as indicated in Fig. 1 to provide space for above mentioned wheel 24 and a cross member 34, unites the rear ends of members 30 and 31, extended to the rear of wheel 24.

As seen in Figs. 2 and 3, an axle 35 is carried by member 30, a cotter pin or the like 36 serving to prevent displacement of the axle. Axle 35 is also held in above mentioned member 31 in similar manner. Drawbar 21 is accordingly supported from ground wheel 24 through axle 35.

Draw bar 21 also has a pole or tubular element 37, Fig. 1, slidable in above mentioned member 32 and, as seen in Fig. 3, extending backwardly into the space between members 30 and 31 where it is received in a member 38. A pin 39 is inserted through aligned openings in deck 33, member 38, and tube 37, for preventing inadvertent displacement of tube 37, and a collar 40 is fixed with member 32 and clamped on tube 37 as by a bolt 41.

Pole 37 has a clevis generally designated as 42 for attachment of a tractor or other pulling device not shown.

As seen in Fig. 3, pole 37 has an extension 43 which may also be provided with an opening for pin 39 and which extension is used as will appear for purposes of transport.

Support for tubular member 29 and accordingly for the balance of the machine, is afforded by upright members 44 and 45, Fig. 2, which are rigidly fixed with member 29 and extend downwardly past axle 35. Member 44 has a bearing portion 46 on axle 35 and member 45 has a bearing portion 47 also on axle 35 transferring the weight of tubular member 29 and its attached parts to axle 35 and accordingly to wheel 24. Assuming platform 20 and its attached parts to be supported in rigid relation to tubular member 29, it will be seen that the whole machine can be rocked about axle 35 as a pivot. This action is utilized to raise and lower cutter bar 22.

The adjusted position of pipe 29 is established and controlled as seen in Fig. 3. Thus member 44 has fixed therewith an adjusting lever generally designated as 48, in the present instance comprising an A frame having an upper member 49 fixed with a plate 50a fastened to pipe 29 and a lower member 50 united in the present instance by a ring-like member 51. A tubular extension 52 is received in member 51 and has a handle portion 53 disposed within reach of an operator on the tractor. A detent 54 of suitable or well-known form engages a notched bar or quadrant 55 operating in a guide 56, Fig. 2, for holding lever 48 in adjusted position. Bar 55 has an extension 57 slidable in a clevis 58 and carrying an abutment 59 urged downwardly by a spring 60 compressed between clevis 58 and abutment 59. An ear 61 is fixed to draw bar 21 receiving a pin 62 engaged in clevis 58 and providing pivotal connection between clevis 58 and accordingly bar 55 and draw bar 21. Spring 60 normally holds bar 55 in a fixed downward position but in the event of an obstruction or any other tendency to rise on the part of platform 20, or its attached parts, spring 60 may compress momentarily and thus provide for upward movement of bar 55 and relief of excessive stress in the parts. An extension rod 63 leads from detent 54 to an auxiliary handle 64 which may be actuated by the hand that controls handle 53.

Tube member 52 is extended rearwardly of ring-like member 51 and secured in a member 65, in the present instance fixed with member 50, and prevented from being displaced by means of a bolt or the like 66. Removal of bolt 66 provides for shifting of tube 52 by sliding out of members 51 and 65 when preparing the machine for transport.

As more particularly seen in Fig. 4, detent 54 is slidably carried in a fitting 67, of which guide 56 is a part, fixed in the present instance with member 49, rod 63 being pivotally or otherwise attached to detent 54 so that it may be arranged in reversed relation as suggested in Fig. 16. Fitting 67 has a partition 68 through which detent 54 is slidable and a spring 69 is compressed between an abutment 70 and a portion of fitting 67 for holding detent 54 in engagement with bar 55. When it is desired to narrow the machine for transport, rod 63 is folded back against member 50 and tube member 52 is released and slid inwardly along member 50, as suggested by dotted lines in Fig. 3.

A brace 71, Fig. 2, extends between adjusting lever 48 and a plate 72, fixed with pipe 29.

Upright members 44 and 45 are very strongly made but owing to the upward displacement of pipe 29 from axle 35, and the great length of pipe 29, relative to the spacing of members 44 and 45, the latter would not be sufficient connection for pipe 29 without making the parts prohibitively heavy. Accordingly a bracing system is provided which will give the necessary rigidity with less weight and incidentally support the mechanism necessary for actuating the various machine elements. Thus upright members 73, 74 and 75 are also fixed to pipe 29 and spaced at intervals from member 45 toward the grain end of the machine, member 73 being connected in the present instance with plate 72. Above mentioned member 45 and members 73, 74 and 75 are tied together in the present instance by a plurality of members as 76 and 76a, Fig. 3, and members 74 and 75 are rigidly braced by cross braces 77 and 78. In this manner yielding laterally of the direction of motion of the machine by member 45 is effectively prevented. With the structure so far described, there would still be a tendency to force members 44, 45, 73, 74 and 75 out of a common plane by the very considerable stresses set up by the reaction of the cutter bar and wheel 25. This is resisted by a box-like frame work comprising forwardly extending members 79, 80, 81 and 82, Fig. 17.

Members 79 and 81 are united at their forward ends by a cross member 83 while members 80 and 82 are united at their forward ends in the present instance by a Z bar 84 constituting part of above mentioned cutter bar 22. Members 79 and 80 are united at their forward ends by a gusset plate 85 while members 81 and 82 are united by a gusset plate 86. Thus a box-like frame-work is formed which would be materially distorted in the event of relative displacement of members 73 and 75. The frame-work is braced against such distortion and accordingly serves to prevent relative displacement of said members.

Thus, cross braces 87 and 88 extend from the neighborhood of members 75 and 73 respectively to approximately the point of juncture of gusset plates 85 and 86 with Z bar 84. Braces 87 and 88 are anchored at their forward ends in the present instance in gusset plates 89 and 90, the latter further tending to stiffen the structure and furnishing a more durable anchorage for the several members which are joined at these points. Braces 91 and 92 extend respectively from a plate 93 fixed with above mentioned upright member 75 and from above mentioned plate 72 forwardly and downwardly substantially to Z bar 84, being anchored respectively to members 81 and 79 and also to gusset plates 86 and 85. Brace 91 passing diagonally across the space between members 81 and 82 prevents distortion of the rectangle defined by member 81, gusset plate 86, member 82 and member 75. In like manner, brace 92 prevents distortion of the rectangle formed by member 79, plate 85, member 80 and member 73. Plates 86 and 85 assist materially in so bracing these rectangles as will be apparent. A brace 94 extends from the juncture of member 79 with member 83 to the juncture of member 82 with Z bar 84. This prevents distortion of the rectangle formed by member 83, plate 85, Z bar 84 and plate 86. Above mentioned braces 77 and 78 as above explained prevent lateral distortion of the rectangles formed by the several vertical members 45, 73, 74 and 75, the pipe 29 and members 76 and 76a. The several adjoining rectangles, and braces, as above described, form a structure which is substantially rigid and through which the pull of draw bar 21 may be transmitted to pipe 29 and cutter bar 22 without appreciable distortion or straining of the parts. With this in view, a brace 95 extends from a pivotal connection 96 on member 75 to a connection 97 on member 31 of draw bar 21. Pivot 96 is preferably located in line with above mentioned axle 35 and as pipe 29 and its attached parts are rocked about said axle, pivotal movement takes place at pivot 96.

Upon a pull being exerted on draw bar 21 and resistance developed at the end of the machine spaced from the draw bar, forward motion of member 45 would tend to take place with relative backward yielding of member 44. Box-like structure 26 would then tend to separate somewhat from draw bar 21. This, however, is prevented by brace 95 which is put under tension under such conditions. The resulting forces tend to pull member 75 forward but to push back on member 45, assuming member 44 to be more readily yieldable than the others. However, members 75 and 45 being tied together by pipe 29, members 76 and 76a, and above described rigid box-like frame 26, cannot yield out of a common plane. Assuming the several parts and braces are properly designed so as to be strong enough for their respective purposes, the pull of the draw bar is transmitted to the transverse frame-work without appreciable distortion or lagging of the grain end of the platform.

An alternative method of transmitting the pull of draw bar 21 to portion 26 is shown in Fig. 18. Here a gusset plate 85a corresponding to above mentioned gusset plate 85 and connected to members 79a, 83a, 94a, etc., after the manner of Fig. 17, supports a track, rail, or guide 98 preferably arcuate in form and curved about axle 35a as a center. Extending from member 31a of draw bar 21 is a plate 99 providing a notch at 100 engaging rail 98. Plate 99 is preferably braced by a member 101 connected also with member 31a. Box-like structure 26 and rail 98 may accordingly swing freely about axle 35a as a center, rail 98 traveling up or down in notch 100. However, any tendency toward separation or relative lateral movement between portion 26 and draw bar 21 is effectively prevented by engagement of rail 98 and plate 99. In operation this results in a tension in member 94a which corresponds to above mentioned member 94. This tension is transmitted to Z bar 84a as will be apparent.

It is also to be noted that tension in brace 95 is also transmitted through compression in members 76 and 76a and tension in brace 88 to Z bar 84. It will therefore be apparent that the construction involving brace 95 and the construction involving plate 99 and rail 98 are to an extent equivalent, either one being considered an expedient for transmitting the draw bar pull to the laterally extending platform. However, in view of the inherently flexible or springy nature of the relatively light construction necessary to be used in agricultural implements, it is advisable under certain conditions to use both brace 95 and the combination of plate 99 and rail 98.

Platform 20, as seen in Figs. 1, 2 and 3, is located substantially ahead of the pivot point defined by axle 35 so that the whole structure would tend to rotate counterclockwise as seen in Fig. 3, due to the weight of the parts, if not prevented. Counterbalancing springs 102, 103 and 104 are tensioned in effect between pipe 29 and the rearward extensions of members 30 and 31. Thus spring 102 is anchored in above mentioned plate 50a and at its lower end to a nut 105. Nut 105 is retained by a bolt 106 in the present instance threaded in nut 105 and journaled in a bracket 107 fixed with the rearward extension of member 30. In similar manner, springs 103 and 104 are anchored to above mentioned plate 45a and connected to a nut 108 threaded on a bolt 109 journaled in a bracket 110 and fixed with the rearward extension of member 31.

Adjustments of bolts 106 and 109 may regulate the tension in springs 102, 103 and 104 to partially or entirely counterbalance the downward tendency of platform 27. In this manner the weight of the mechanism is removed from adjusting lever 48 and bar 55 and the mechanism is easily adjusted.

At the grain end of pipe 29, a plate 111 is attached as by welding and to which is fastened an upright member 112. Member 112 extends downwardly from pipe 29 and as seen in Fig. 4 carries an axle 113 on which is journaled above mentioned wheel 25. In the present instance axle 113 is disposed in line with above mentioned axle 35 so that swinging of platform 20 about the axles will result in uniform adjustment of cutter bar 22.

Axle 113 is held in above mentioned upright member 112 and a bracing plate 114 suitably fixed with member 112 as by welding, and a frame member 115, extends forwardly and rearwardly from member 112 to define the outer or grain end of platform 20.

Member 115 joins Z bar 84 which as above indicated defines the front end of platform 20. Member 115 also extends rearwardly slightly and is fixed to a member 116 which extends transversely of the machine and defines the rear edge of platform 20. Member 116 joins a member 117, Fig. 2, which extends forwardly of the machine and joins Z bar 84 at a point spaced from above mentioned mechanism 26, as seen in Fig. 1. A rectangular platform is thereby defined having an uninterrupted space for the depositing of a windrow. A member 118 extends forwardly approximately midway between members 115 and 117 for bracing the mid-portion of platform 20. Member 118 being also joined to Z bar 84. Diagonal braces 119 and 120 extend forwardly and inwardly from members 117 and 115 respectively, to the juncture of member 118 and Z bar 84. A deck 121, Fig. 5, is carried on members 84, 115, 116, 117 and 118 to form a closed bottom for the platform. Deck 121 braces and strengthens the entire structure and, to strengthen cutter bar 22 where it spans opening 28, a reinforcing plate 121a, is fixed at the rear of the cutter bar, within opening 28, but so as not to interfere with the depositing of the windrow through the opening.

As stated above, platform 20 is supported from pipe 29 and this is accomplished as follows. Plates 122 and 123 are welded or otherwise fixed to pipe 29, plate 123 for example, as seen in Fig. 5, curving rearwardly and downwardly and having an upright member 124 suitably fixed therewith and extending downwardly to above mentioned member 118. Rearwardly of member 124, a member 125 extends downwardly and rearwardly and is joined to a rearward extension 126 of member 118. In substantially similar manner, plate 122 has a vertical member 127 and an inclined member 128 extending downwardly to an extension 129 of above mentioned member 117.

Harvester platforms of this general nature are prone to sag and warp. Furthermore, slight variations in manufacture are substantially unavoidable. Accordingly an expedient has been devised for compensating for such inequalities and thereby applying the strength of pipe 29 in the most effective manner to brace platform 20. Thus, as seen in Figs. 9 and 10, member 125 is slotted at 130 and has a clamping bolt 131 for clamping it in fixed relation to extension 126. However, to avoid reliance upon the friction of the clamping action in maintaining the adjustment, a member 132 is fixedly secured to member 125 as by a bolt 133 and has an outwardly extending flange 134. In assembly of the machine, suitable washers 135—135 are placed between the flange 134 and member 126, bolt 131 being slack for the moment, in sufficient number that the desired relation is secured between member 125 and extension 126, whereupon a bolt 136 is passed through flange 134, washers 135 and extension 126 and solidly tightened. This establishes an unchangeable relation between member 125 and extension 126. Bolt 131 is then finally tightened and no change in the adjustment is likely to follow during long periods of use. A substantially exactly similar arrangement not necessary to show and describe in detail is used at 137 on member 128. To facilitate adjustment of this nature, member 124 is connected to member 118 preferably by a single element or pivot 138, Fig. 5.

A baffle 139 is arranged substantially vertically against members 124 and 127 and serves to prevent material harvested by cutter bar 22 from being thrown over the rear of platform 20 by reel 23 and also the usual purposes of a wind shield commonly provided in harvesters generally, substantially at this point. Baffle 139 and platform 20 are further braced against weaving or twisting by diagonal braces 140 and 141, Fig. 2.

Returning to plate 111, a member 142, Fig. 4, extends downwardly and joins with members 116 and 115 to form the outer rear corner of platform 20, the space being filled in by a panel 143. Forwardly of pipe 29, a member 144 extends forwardly and downwardly to Z bar 84, at a point spaced outwardly from member 115, panel 143 also closing the space thereby defined. Baffle 139 as more particularly indicated in Fig. 2 also engages member 142. As indicated in Fig. 1, cutter bar 22 extends beyond member 115 and above mentioned member 144 joins Z bar 84 substantially in line with wheel 25. By this means, cutter bar 22 cuts a path for wheel 25 and no grain is trampled thereby. Axle 113 has a fitting 145 to which is attached a brace 146 extending forwardly and joined with Z bar 84. In this way, axle 113 is solidly braced against displacement but without encroaching upon platform 20. A divider point of sheet metal or other well-known construction 147 is supported above member 144, partially enclosing brace 146 and serving to divide the standing grain from the grain being cut. The space between divider point 147 and above mentioned member 115, is filled in by a panel 148 to prevent escape of grain at this point. Divider point 147 in the present instance is pivotally supported at 149 on Z bar 84 so that it may be rocked for vertical adjustment. The tendency of the front end of point 147 is to go down and a chain 150 is connected to point 147 at 151 and received in a suitable opening 152 in above mentioned member 144 for arresting upward movement of the rear end of point 147 and accordingly downward movement of the front end. The effective length of chain 150 may be altered by engaging different links in opening 152 for the adjustment of point 147.

In the neighborhood of mechanism 26, a second divider point 153 is supported from the above mentioned box-like frame including members 81, 82 and plate 86, a brace 154 being extended from member 83 to assist in the support thereof. Divider point 153 comes into play particularly when opening up a field.

A shield 154a is carried on brace 91 to prevent material from being thrown into mechanism 26, and a brace 154b fixed with shield 154a maintains the latter in position. Brace 154b has openings 154c and one of which is engaged with a bolt or the like 154d so that the position of shield 154a may be changed to suit different conditions.

As above indicated, sickle or cutter bar 22 is actuated from above mentioned ground wheel 24, in the present instance wheel 24 having connected therewith a sprocket 155 driving, through a chain 156, a sprocket 157 in the present instance fixed on a shaft 158 carried in bearings 159 and 160 supported in the present instance from plates 45a and 93 respectively. Shaft 158 has journaled thereon a sleeve 161. Shaft 158 as more particularly indicated in Fig. 6, may rotate idly within sleeve 161 except when driven by means of a clutch mechanism generally designated as 162. Certain of the machine elements being driven from sleeve 161, clutch 162 furnishes a means for controlling the operation of these elements. Sleeve 161 has attached thereto, in the present instance by a flange 163, a sprocket 164, a collar 165 of any suitable construction being fixed with shaft 158 to prevent endwise shifting of the assembly including sleeve 161. Sleeve 161 also has a sprocket 166 attached as by a flange 167, sprocket 166 including clutch teeth 168 engageable by mating teeth 169 on a clutch collar 170. Clutch collar 170 in the present instance is slidable on shaft 158 but prevented from rotating relative thereto by a feather key 171. Key 171 extends completely through clutch collar 170 to a point providing substantially only running clearance between itself and sprocket 166 within teeth 168. For this reason, clutch collar 170 may be shifted to the right as seen in Fig. 6, while sleeve 161 is prevented by key 171 from sliding on shaft 158. In the present instance clutch collar 170 is normally maintained in engagement with teeth 168 on sprocket 166 by means of a spring 172 compressed between clutch collar 170 and a collar 173 fixed on shaft 158 in any suitable manner. Collar 173 is preferably also utilized to prevent endwise movement of shaft 158 in one direction while adjacent the other end of shaft 158 a collar 174 prevents endwise movement in the other direction. Clutch collar 170 may be shifted into and out of engagement with teeth 168 as will be later described.

Sprocket 164 drives, through a chain 175, Fig. 7, a sprocket 176 in the present instance fixed on a shaft 177 carried in suitable bearings 178 and 179, Fig. 1, carried respectively in upright members 73 and 74 and a strut 180, extending from upright member 74 forwardly to above mentioned member 83. An idler sprocket 181, Fig. 7, journaled on a stud 182 is adjustable in any suitable or well-known manner in a slot 183 formed in a bracket 184 carried by upright member 73 and serves to adjust the degree of tightness of chain 175.

Shaft 177 carries a fly wheel 185 constituting a crank for a pitman 186. Pitman 186 may be of any preferred type, in the present instance having a crank pin bearing 187 and extending forwardly to a pivotal connection 188, Fig. 1, with a bell crank unit generally designated as 189. Bell crank 189 is journaled on a pivot 190 carried in a plate 191 supported by above mentioned members 79 and 180 and bell crank 189 has an arm 192 connected by a pivotal connection 193 with a link or pitman 194 connected by a pivotal connection 195 with a reciprocable sickle member 196 in any suitable or well-known manner. Rotation of shaft 177 will accordingly cause reciprocation of sickle 196 and this may be controlled by engaging or disengaging clutch 162 as above suggested.

Sprocket 166 drives, through a chain 197, as more particularly shown in Fig. 8, sprocket 198 fixed on a shaft 199 constituting the axis of above mentioned reel 23. Reel 23 is accordingly driven whenever clutch 162 is engaged and the windrower is drawn along the ground.

Reel 23 comprises in the present instance above mentioned shaft 199, Fig. 1, on which are fixed a plurality of spiders 200, 201 and 202 carrying bats 203—203. Reel shaft 199 is carried in bearings 204 and 205 in the present instance carried on arms 206 and 207 respectively. Arm 206 is pivoted at 208 to above mentioned plate 93 and a brace 209, Fig. 3, is pivoted at 210 to arm 206. Brace 209 is made adjustable in the present instance by telescoping within a pipe or the like 211 pivoted at 212 to above mentioned brace 91. In similar manner, arm 207, Fig. 4, is pivoted to above mentioned plate 111 at 213 and supported by a brace 214 adjustable in a pipe or the like 215 pivoted to above mentioned member 144, suitable or well-known means being provided for locking the braces 209 and 214 in adjusted positions in their respective pipes. In this manner, reel 23 may be adjusted into proper relation with cutter bar 22.

As shown in Fig. 8, an arm 216 is journaled on a pin or the like 217 and has journaled at its ends sprockets 218 and 219, chain 197 being directed beneath sprocket 219 and over sprocket 218. Arm 216 is urged in a clockwise direction, as seen in Fig. 8, by a spring 220 in the present instance stretched between arm 217 and above mentioned arm 206. In this manner a continuous tension is exerted on chain 197 and compensation is effected for changes in the center distance between sprockets 166 and 198 caused by adjustments of the reel.

Platform 20 includes above mentioned apron 27 having a canvas 221, Fig. 2, carrying slats 222 and being disposed about rollers 223 and 224, Fig. 1. When the machine is in operation, canvas 221 moves toward opening 28 in the present instance being driven from above mentioned grain wheel 25.

Wheel 25 carries a sprocket 225 driving, through a chain 226 a sprocket 227 fixed with a shaft 228 carried in bearings 229 and 230 on a bracket 231 carried in the present instance by member 142. A clutch collar 232 is slidably keyed to shaft 228 and forced by a spring 233 normally into engagement with clutch teeth on a gear 234 journaled on shaft 228. Gear 234 drives a gear 235 fixed on a shaft 236 leading to above mentioned roller 224. Accordingly whenever wheel 25 is rotated by forward motion of the machine, the parts are actuated to rotate roller 224, causing travel of apron 27.

An advantage of this construction lies in the fact that movement of apron 27 will stop momentarily upon the negotiation of a sharp right turn. This is so because with the arrangement disclosed, wheel 25 acts substantially as the pivot about which the machine swings in making such a turn. Accordingly, during this period wheel 25 does not rotate and apron 27 is not driven. A gap is thus left in the windrows at the points at which the machine is turned at the corners of the field. This is of advantage in that it leaves a pathway into and out of the center of the field so that the windrower may be driven out of the field after completing the harvesting, without trampling any windrows.

Some operators make an exceedingly sharp turn, so much so that the machine pivots substantially about stubble wheel 24. Under these conditions wheel 25 will actually reverse during part of the turn. It would not be desirable for apron 27 to reverse, and accordingly the teeth of clutch collar 232 are made with an inclined rear face so that they will be forced out of engagement with the teeth on gear 234 by reverse rotation of shaft 228, compressing spring 233. Thus clutch collar 232 acts both as a manually controlled clutch and has an overrunning clutch to prevent reverse rotation of gear 234. The teeth on gear 234 are preferably formed to interfit with those of collar 232 to facilitate this action.

Roller 223, as seen in Figs. 1 and 2, is journaled on a shaft 237, supported in a portion 238 carried by an adjusting rod 239. Rod 239 passes through a flange 240 of a bracket 241 and has a nut 242 by which rod 239 may be extended to shift roller 223. A substantially similar construction is arranged at the opposite end of roller 223. By means of these adjustments roller 223 may be shifted to maintain the required degree of tightness in apron 27.

In the event that it is desired to stop apron 27 at other times than when turning, or for longer periods than during such turns, clutch collar 232 may be disengaged from gear 234 by means of a bell crank 243 (Fig. 2) journaled on a pivot 244 carried on a bracket 245 fixed with above mentioned member 142, a cable or the like 246 extending from bell crank 243 over a sheave or the like 247 anchored to pipe 29 at 248. Cable 246 extends in the present instance partly through pipe 29 and may be controlled by the tractor operator.

As seen in Fig. 19, cable 246 passes into pipe 29 and is joined to a spring 246a, for example by a clamp 246b. Spring 246a is joined to a continuing section 246c of cable 246, for example by a clamp 246d so that a pull on section 246c will be transmitted, through spring 246a to cable 246 and disengage clutch collar 232. A continuing pull on section 246c beyond the range of movement of clutch 232 will elongate spring 246a. Section 246c passes over a sheave 249 and extends outwardly through an opening 250 in pipe 29, being united with a cable 251 for example by a clamp 252. Cable 251 passes about a sheave 253 anchored at 254 to above mentioned lever element 49 and passes forwardly to a control lever 255. Lever 255, as more particularly shown in Fig. 21, is pivoted at 256 to above mentioned lever 52 and may be swung to the dotted positions shown in Fig. 21. Cable 251 is provided in the present instance with a fitting 256a pivoted at 256b to lever 255, so that shifting of the lever will cause lengthwise motion of cable 251. Lever 255 is capable of the two dotted positions A and B, in addition to the position of operation, shown, and for this purpose a quadrant 256c is fixed with lever 52 and has notches 256d and 256e engageable by a detent 256f for maintaining lever 255 either in position A or position B as desired. Detent 256f may be of any suitable construction, in the present instance having a spring 256g for forcing the detent into notches 256d and 256e, and a handle 256h for withdrawing the detent when it is desired to shift the lever. Movement of lever 255 to position A will pull on cables 251, 246c and 246 sufficiently to disengage clutch collar 232. This movement also controls above mentioned clutch 162.

Thus, cable 251 is connected to a lever arm 258, Fig. 20, of a shipper generally designated as 259 and pivoted at 260 to above mentioned pipe 29. Shipper 259 has a forked or otherwise suitably formed end portion 261 for engaging above mentioned clutch collar 170. A sufficient pull on cable 251 by means of lever 255, as above described, will accordingly also disengage clutch collar 170 from clutch teeth 168. Lever 255 accordingly serves to stop the operation of all units of the machine. However, the lengths of cable 251, 246, 246c, etc., are so chosen that clutch 232 is disengaged when lever 255 is placed in position A but clutch collar 170 is undisturbed. On the other hand, if lever 255 is placed in position B both clutch collars 232 and 170 are disengaged, the necessary travel for disengaging collar 170 being obtained by elongating of spring 246a.

A machine of this character is of substantial width and accordingly certain expedients are provided for readily transporting the same between fields or otherwise. Thus, as suggested in Fig. 3, the machine is suitably supported and draw bar portion 37 is removed from the main portion constituted by members 30, 31 and 33 (see also Figs. 1, 11, 12, and 22). Draw bar portion 37 is then placed, as seen in Fig. 2, adjacent above mentioned wheel 25, portion 43 of the drawbar extending through a hole 262 (Fig. 4) in wheel 25, and engaging a socket portion 263 extended downwardly from above mentioned member 112. Portion 43 is prevented from being inadvertently removed from socket portion 263, for example by a pin 264. Pin 264 communicates the pull of the tractor or other drawing expedient to member 115 and therefore to platform 20 during transport.

A brace 265 is connected at 266 to pipe 29 and at 267 with draw bar portion 37, substantially midway of the length thereof in the present instance. Referring to Fig. 22, a brace 268 is connected, also at 267, with draw bar portion 37 and with Z bar 84 at 269. Draw bar portion 37 is therefore rigidly braced substantially in the extension of the plane of platform 20, and furnishes a tongue to which a tractor may be connected for drawing the windrower lengthwise of platform 20 which direction is of course transverse to its direction of movement when harvesting. The grain end of platform 20 is supported on the tractor through draw bar portion 37. The stubble end of the windrower is jacked up and placed on brackets 270 and 271 connected by an axle 272 supported on wheels 273 and 274. In this manner, wheel 24 is supported clear of the ground and the machine may move in the direction of draw bar portion 37. Referring to Fig. 3, it will be apparent that, if draw bar portion 37 has been removed, and lever 52 telescopes along member 50 to the dotted position, the "width" of the machine when traveling in this condition, namely directly away from the reader, will be materially reduced as compared with its width under harvesting conditions. Comparing Fig. 3 with Fig. 2, the "width" will be approximately one-half of the width of the machine when harvesting. This is amply narrow for passage through the usual farm gates and also for transport on the highway.

A modification of the drive to apron 27 is indicated in Fig. 14. In this embodiment an apron 27a is shown passing about a roller 275 fixed on a shaft 276 journaled in suitable bearings as 277. In this instance the parts are so proportioned that apron 27a runs slightly below the upper flange 278 of a Z bar generally designated as 279, forming part of a sickle 22a. A shield or cover member 280 projects backwardly from flange 278 and covers the edge of apron 27a.

In the present instance apron 27a is driven from roller 275 at the discharge end of the apron instead of at the grain end as in the previous instance. Shaft 276 carries a sprocket 281 which is driven by a chain 282 extending along Z bar 279 within the channel formed between above mentioned shield 280 and a lower flange 283 of Z bar 279. Since very little power is required to drive an apron of this nature, there is ample room in this channel to accommodate a chain of sufficient dimensions to actuate apron 27a. Chain 282 in effect is substantially inside of cutter bar 22a and is completely protected from straw or other material being cut and as will be apparent does not encumber the space for the material being cut to leave the machine and be deposited on the ground. In this manner, an apron drive is provided from mechanism 26 without the use of any rear frame, backboard or the like for carrying operative mechanism.

Supported at any convenient point on Z bar 279, clear of opening 28a, is a housing 284 fixed in the present instance on a plate 285 carried by Z bar 279. Housing 284 has journaled therein a shaft 286 carrying a driving sprocket 287 engaged with above mentioned chain 282. Shaft 286 is driven from shaft 288 also journaled in housing 284 and driving shaft 286 through bevel gears 289 and 290. Shaft 288 has fixed therewith a sprocket 291 driven by a chain 292 from a sprocket 293 journaled in the present instance on a sleeve 161a. Sleeve 161a, as will be apparent, corresponds to above mentioned sleeve 161 and when rotated through a clutch 162a effects a drive to the various parts of the machine. Sprocket 293 may be locked to sleeve 161a by a clutch collar 294 slidably keyed on sleeve 161a and having clutch teeth 295 engageable with clutch teeth 296 on sprocket 293. Sprocket 293 in the present instance is restrained against longitudinal movement between a collar 297 and a key 298 fixed with sleeve 161a and a spring 299 is arranged to continuously urge clutch 294 into engagement with teeth 296 on sprocket 293. Spring 299 in the present instance is compressed between clutch collar 294 and a collar 300 fixed on sleeve 161a. A shipper lever 301 pivoted on a fulcrum 302 carried by a member 303 fixed with a convenient part of the machine is engaged with clutch collar 294 and has an arm 304 to which is connected a cable 246a corresponding substantially to above mentioned cable 246. A pull on cable 246a will shift clutch collar 294 to the position shown so that apron 27a will not be driven, even though clutch 162a is engaged. On the other hand, when cable 246a is slack, spring 299 forces clutch collar 294 into engagement with clutch teeth 296 whereupon sprocket 293 and the connected machine elements are driven so as to actuate apron 27a. Thus apron 27a is operated from sleeve 161a whenever both clutches 162a and 294 are engaged.

It is to be noted that above mentioned clutches 162 and 162a have teeth which are sloped on their rear faces, so that they will be disengaged in the event that the machine is backed. Thus it is impossible to run the apron or the reel backwards, which might cause damage in the event the machine was loaded with grain or for other reasons.

The machine may readily be used as a power take-off machine, and if this is desired it is provided with a pulley 305, Fig. 1, fixed on a shaft 306 journaled in a torque tube 307 suitably fixed as by a clamp 308 with deck portion 33 of draw bar 21. Tube 307 connects with a housing 309 from which extends a shaft 310 which is connected in any suitable or well-known manner with the power take-off on the tractor, not shown. Shaft 310 drives shaft 306 through gears 311 and 312 in housing 309.

The parts just described may remain on the windrower permanently without interfering with the ground drive for the sickle and other parts. A pulley 313, Fig. 13, is furnished on shaft 177 and a belt 314 is disposed about pulleys 305 and 313, chain 175 being removed. Rotation of pulley 305 by power take-off shaft 310 will therefore rotate shaft 177 and drive sickle 22 as above explained.

Changing from ground to power take-off drive, insofar as the windrower is concerned, involves merely removing chain 175 and applying belt 314. If the machine is to be used exclusively as a ground driven machine, shaft 306, pulleys 305, 313, and their attached parts may be omitted, whereas, if it is to be exclusively power take-off driven, sprockets 164, 176, and chain 175 may be omitted, along with tightener bracket 184, etc.

Since chain 156 is not disturbed in making these changes, reel 23 will continue to be driven as before from sleeve 161, while apron 27 will be driven from wheel 25 or also from sleeve 161, or 161a, in the case of the modification shown in Fig. 14. Since these are very light drives, it is extremely unlikely that conditions would be encountered where there would be trouble from lack of sufficient traction if other conditions were at all suitable for windrowing.

Since shaft 177 is not on the same center as axle 35, pulleys 305 and 313 will change their center distances when platform 20 is adjusted by swinging about axle 35. Consequently, a belt adjuster or tightener is provided comprising an arm 315 rockably mounted by means of a shaft 316 carried on deck 33 as more particularly shown in Fig. 1. Arm 315 has journaled thereon as by pins, studs or the like 317 and 318, Fig. 13, pulleys or rollers 319 and 320. Belt 314 is directed below pulley 320 and above pulley 319 whereby rocking of arm 315 will take up or let out belt 314 in accordance with the direction of such rocking. Arm 315 is connected by a link 321 pivoted at 322 to the arm and at 323 to an arm 324 in the present instance extended from plate 45a.

As more particularly seen in Fig. 23, link 321 is threaded, for example, in a fitting 325 which has a pin or stud portion 326 journaled in above mentioned arm 324. Link 321 may therefore be adjusted in length by temporarily disconnecting either pivot 322 or 326 and screwing link 321 in or out of fitting 325. Adjustment is thereby possible of the degree of tightness of belt 314.

To take care of large variations in belts or other conditions, an extra opening 327 is preferably provided to receive link 321, if a less degree of shortening of belt 314 is required than that shown.

When the adjustment of belt 314 is once established, it will be noted that, while counterclockwise swinging of pipe 29 and its attached structure about axle 35, for lowering the cutter bar, would loosen belt 314, such movement, through link 321, would cause clockwise rocking of arm 315 with an accompanying tendency to shorten belt 314. This will substantially compensate for loosening caused by adjustment of the cutter bar, and maintain a satisfactory tension in belt 314. As will be apparent, the reverse action takes place when the parts are adjusted in the opposite direction and further adjustments of belt 314 are not necessitated by adjustments of cutter bar 22.

The operation of the disclosed machine is thought to be clear from the above description, but it is noted that the general structure of the machine is very sturdy by virtue of the use of the strong light tubular member 29. Pipe 29 and cutter bar 22 form a truss to resist rearward bending of the platform structure and pipe 29 resists any tendency toward twisting of the platform relative to draw bar 21.

Cutter bar 22 and reel 23 are driven from stubble wheel 24 and without the interposition of bevel gears on any heavy duty drive. Apron 27 is driven from grain wheel 25 and may be made to automatically stop momentarily by turning sharply to the right in the embodiment of the machine illustrated. This is advantageous in that it leaves a pathway through the windrows by means of which the outfit may be driven off the field without trampling any of the harvested windrows. By utilizing lever 255 either apron 27 or the whole operative mechanism of the machine may be stopped or started at will. In a modified arrangement of the machine the apron 27 may be driven from stubble wheel 24 by means of a driving element or chain passing in effect through the cutter bar so as not to encumber the opening through which the windrow is formed.

When conditions require, or for other reasons, sickle 22 may be driven by a power take-off connection but in which event reel 23 and apron 27 continue to be ground driven with the advantage that movement of these parts is always proportional to the forward travel of the machine.

For transportation, a portion of draw bar 21 is removed and readily applied to the grain end of the machine while auxiliary wheels are placed under or near the opposite end. In this manner, the machine is narrowed to about half its operative width for ready transportation.

The above being a complete description of an illustrative embodiment of the invention, what is claimed as new and desired to be secured by Letters Patent of the United States is:

1. In a windrowing machine, the combination of a platform, cutting mechanism, and driving mechanism for the cutting mechanism, said platform having a rearwardly directed opening therein for the deposit of a windrow through the opening and adjacent said driving mechanism, and a frame comprising a tubular member spaced above said platform and bridging across the opening in said platform and connecting said platform and said driving mechanism.

2. In a harvesting machine, including a platform and cutting mechanism, disposed transversely to the direction of progress of the machine, a draw bar connected to one end of the machine, a stubble wheel associated with the draw bar and a grain wheel disposed at the opposite end of the platform from said draw bar, actuating mechanism for said cutting means, an apron conveyor on said platform and driving connections from said grain wheel for actuating said apron conveyor.

3. In a harvesting machine, including a platform and cutting mechanism, disposed transversely to the direction of progress of the machine, a draw bar connected to one end of the machine, a stubble wheel associated with the draw bar and a grain wheel disposed at the opposite end of the platform from said draw bar, actuating mechanism for said cutting means, and an apron conveyor on said platform and driving connections, including a manually shiftable clutch, extending from said grain wheel for actuating said apron conveyor.

4. In a harvesting machine, including a platform and cutting mechanism, disposed transversely to the direction of progress of the machine, a draw bar connected to one end of the machine, a stubble wheel associated with the draw bar and a grain wheel disposed at the opposite end of the platform from said draw bar, actuating mechanism for said cutting means, an apron conveyor on said platform and driving connections, including a manually shiftable and over-running clutch mechanism, extending from said grain wheel for actuating said apron conveyor.

5. In a harvesting machine, having a draw bar and a tiltable platform, a power take-off pulley on said draw bar, a driven pulley on said tiltable platform structure, a belt connecting said pulleys, a rockable lever pivotally mounted on said draw bar, an idler pulley on said lever and disposed to be pressed against said belt for tightening the latter by rocking movement of said rockable lever and a connection from said tiltable platform structure for rocking said lever in response to tilting of said platform structure to compensate for changes in the center distance between said pulley caused by rocking of said platform structure by shifting of said rockable lever to change the relation of said idler pulley to said belt.

6. In a windrowing machine the combination of a driving mechanism including a supporting wheel, a tubular frame member spaced above the ground sufficiently to clear a windrow being formed by the machine and extending laterally from said driving mechanism, a supporting wheel at the end of the tubular frame member remote from said driving mechanism, a platform spaced downwardly from said frame and extending from the last named end thereof backwardly to a point spaced from said driving mechanism to provide an opening for deposit of a windrow, downwardly extending uprights connected between said frame member and said platform and acting to support said platform from said frame member, a sickle disposed at the forward edge of said platform and extending the length thereof and across the opening between said platform and said driving mechanism, connections from the driving mechanism adapted to actuate said sickle and a drawbar connected with said driving mechanism and adapted to be connected with a propelling vehicle.

7. In a windrowing machine the combination of a driving mechanism including a supporting wheel, a tubular frame member spaced above the ground sufficiently to clear a windrow being formed by the machine and extending laterally from said driving mechanism, a supporting wheel at the end of the tubular frame member remote from said driving mechanism, a platform spaced downwardly from said frame and extending from the last named end thereof backwardly to a point spaced from said driving mechanism to provide an opening for deposit of a windrow, a conveyor on said platform, downwardly extending uprights connected between said frame member and said platform and acting to support said platform from said frame member, a cutter bar disposed at the forward edge of said platform and including a Z bar and a plurality of guards, said cutter bar presenting a rearwardly directed channel extending across the space between said platform and said driving mechanism, and a connection from said driving mechanism including a moving element extending across said opening between said platform and said driving mechanism within said rearwardly directed channel, said moving element being connected for driving said conveyor, connections from the driving mechanism adapted to actuate said sickle and a draw bar connected with said driving mechanism and adapted to be connected with a propelling vehicle.

8. In a windrowing machine the combination of a driving mechanism including a supporting wheel, a tubular frame member spaced above the ground sufficiently to clear a windrow being formed by the machine and extending laterally from said driving mechanism, a supporting wheel at the end of the tubular frame member remote from said driving mechanism, a platform spaced downwardly from said frame and extending from the last named end thereof backwardly to a point spaced from said driving mechanism to provide an opening for deposit of a windrow, a conveyor on said platform, downwardly extending uprights connected between said frame member and said platform and acting to support said platform from said frame member, a cutter bar disposed at the forward edge of said platform and including a Z bar and a plurality of guards, said cutter bar presenting a rearwardly directed channel extending across the space between said platform and said driving mechanism, said conveyor having a driving wheel within said rearwardly directed channel, a flexible driving element engaged with said wheel for driving said conveyor, said element extending across the space between said platform and said driving mechanism within said channel, and being connected for actuation by said driving mechanism, connections from said driving mechanism adapted to actuate said cutter bar and a draw bar connected with said driving mechanism and adapted to be connected with a propelling vehicle.

9. In a windrowing machine the combination of a driving mechanism including a supporting wheel, a tubular frame member spaced above the ground sufficiently to clear a windrow being formed by the machine and extending laterally from said driving mechanism, a supporting wheel at the end of the tubular frame member remote from said driving mechanism, a platform spaced downwardly from said frame and extending from the last named end thereof backwardly to a point spaced from said driving mechanism, to provide an opening for deposit of a windrow, a conveyor on said platform, downwardly extending uprights connected between said frame member and said platform and acting to support said platform from said frame member, a cutter bar disposed at the forward edge of said platform and extending across the space between said platform and said driving mechanism, a draw bar pivotally connected with said driving mechanism and adapted to be connected with a propelling vehicle, a torsion resisting framework extending downwardly from said tubular frame member adjacent said drawbar and having a portion also spaced from said tubular frame member in the direction of travel of the machine, relatively movable interengaging elements on said portion of said torsion resisting framework and on said draw bar and adapted to prevent lateral separation of said framework and draw bar without interfering with pivotal movement of said uprights relatively to said draw bar, and an adjustable connection between said tubular frame member and said draw bar for maintaining desired relative rotated position of said tubular frame member and said draw bar for adjusting said cutter bar relatively to the ground.

10. In a windrowing machine the combination of a driving mechanism including a supporting wheel, a tubular frame member spaced above the ground sufficiently to clear a windrow being formed by the machine and extending laterally from said driving mechanism, a supporting wheel at the end of the tubular frame member remote from said driving mechanism, a platform spaced downwardly from said frame and extending from the last named end thereof backwardly to a point spaced from said driving mechanism to provide an opening for deposit of a windrow, a conveyor on said platform, downwardly extending uprights connected between said frame member and said platform and acting to support said platform from said frame member, a cutter bar disposed at the forward edge of said platform and extending across the space between said platform and said driving mechanism, a drawbar pivotally connected with said driving mechanism and adapted to be connected with a propelling vehicle, a torsion resisting framework extending downwardly from said tubular frame member adjacent said drawbar and having a portion spaced from said drawbar in the direction of said platform, and a brace connected diagonally between said portion and a point on said drawbar spaced forwardly of the pivotal connection of said drawbar with said driving mechanism so as to resist lateral separation of said framework and said drawbar by reason of the resistance to distortion of said torsion resisting framework.

11. In a windrowing machine the combination of a driving mechanism including a supporting wheel, a tubular frame member spaced above the ground sufficiently to clear a windrow being formed by the machine and extending laterally from said driving mechanism, a supporting wheel at the end of the tubular frame member remote from said driving mechanism, a platform spaced downwardly from said frame and extending from the last named end thereof backwardly to a point spaced from said driving mechanism to provide an opening for deposit of a windrow, a conveyor on said platform, downwardly extending uprights connected between said frame member and said platform and acting to support said platform from said frame member, a cutter bar disposed at the forward edge of said platform and extending across the space between said platform and said driving mechanism, a draw bar pivotally connected with said driving mechanism and adapted to be connected with a propelling vehicle, said drawbar extending rearwardly of the pivotal connection, means connected between said drawbar and said tubular frame member and adjustable for maintaining desired relative rotated position of the said tubular frame member and said drawbar for adjusting said cutter bar relatively to the ground and counterbalancing spring means connected between the rearward extension of said drawbar and said tubular frame member.

12. In a windrowing machine, the combination of a driving mechanism including a supporting wheel, a frame member having a portion spaced above the ground sufficiently to clear a windrow being formed by the machine and extending laterally from said driving mechanism, a wheel supporting the end of the frame remote from said driving mechanism, a platform extending from the last named end of the frame backwardly to a point spaced from said driving mechanism to provide an opening for the deposit of a windrow, a cutter bar having a channel therein, said cutter bar being disposed at the forward edge of said platform and extending the length thereof and across the opening between said platform and said driving mechanism, a conveyor on the platform, means for driving said conveyor including a movable element extending across said opening within said channel and connected for actuation by said driving mechanism, connections for actuating the cutter bar from said driving mechanism and a draw bar connected with said driving mechanism and adapted to be connected to a propelling vehicle.

FRANK N. G. KRANICK.
CHARLES WM. HANSEN.